INVENTORS
ALGIRDAS J. GRUODIS
LAWRENCE K. LANGE
WILLIAM H. McANNEY
BY Edward G. Fiorito
AGENT 3,155,845
Patented Nov. 3, 1964

3,155,845

THREE LEVEL CONVERTER

Algirdas J. Gruodis, Hyde Park, and Lawrence K. Lange and William H. McAnney, Poughkeepsie, N.Y., assignors to International Business Machines Corporation, New York, N.Y., a corporation of New York Filed Dec. 29, 1961, Ser. No. 163,323
8 Claims. (Cl. 307—88.5)

This invention relates to computer circuits and more particularly, to circuits which operate upon ternary signals.

The conventional AND, OR and INVERTER logic circuits used in binary computers have analogous logic circuits in ternary computers. This invention is directed to the ternary analog of the INVERTER logic circuit. A paper by C. Y. Lee and W. H. Chen "Several Valued Combinational Switching Circuits," Communications and Electronics, No. 25, pp. 278–283, July 1956, published by the American Institute of Electrical Engineers, refers to the ternary analog of the INVERTER as the cycler. The Lee and Chen article states that all of the logical operations in a ternary computer can be performed using a cycler and the ternary analog of the AND logic element. Such a computer would employ a great number of cyclers and, therefore, the feasibility of building this computer would be dependent upon the cost of building a cycler.

A problem in ternary computers, which is more acute than in binary computers, is the problem of signal distortion. As the signals are transmitted from logic circuit to logic circuit, they become weak or distorted. In ternary computers, the signals are capable of existing at one of three different signal levels, as opposed to the binary computer signals which are capable of existing at only one of two different levels. Therefore, the problem of distortion becomes more acute in ternary computers since each logic circuit must be capable of distinguishing between one of three different signal levels instead of only two.

Accordingly, it is an object of the present invention to provide an improved ternary switching circuit capable of cycling three-level signals.

Another object is to provide an improved ternary switching circuit which is economically constructed.

A further object is to provide a ternary switching circuit capable of accepting three-level signals having loose tolerances and providing sharp well-defined output signals having close tolerances.

These and other objects are accomplished in accordance with the broad aspects of the present invention by providing two potential sources corresponding to two of the three signal levels of a ternary input signal. These sources are switched to the output of the cycler by two switches. The signal level of the ternary input not having a corresponding potential source is generated by additional means connected to the switches which are responsive to the condition of the switches. A control circuit accepts the ternary input and directs the operation of the switches to achieve the cycling function at the output.

In accordance with a more limited aspect of the present invention, transistors are used to switch the two potential sourecs to the output. A divider network connected between the collectors of the transistors provides an intermediate voltage corresponding to the signal level of the ternary input which does not have a corresponding potential source. The transistor switches are controlled by an additional transistor and a divider network which accepts the ternary input.

An advantageous feature of the present invention is that the output levels are determined by stable potential sources and not by the input signal levels. An additional feature is the ability of the control circuit to achieve sensitive control of the switches. The control circuit breaks down the three-level input signals into two control signals. The control signals are essentially two valued signals which either activate or deactivate the switches. The ternary input signal can have loose tolerances about each of the three levels without impairing the ability of the control circuit to distribute accurately the two-level control signals to the switches.

The foregoing and other objects, features, and advantages of the invention will be apparent from the following more particular description of preferred embodiments of the invention, as illustrated in the accompanying drawings.

Figures 1, 2, 2A, 3, 3A:
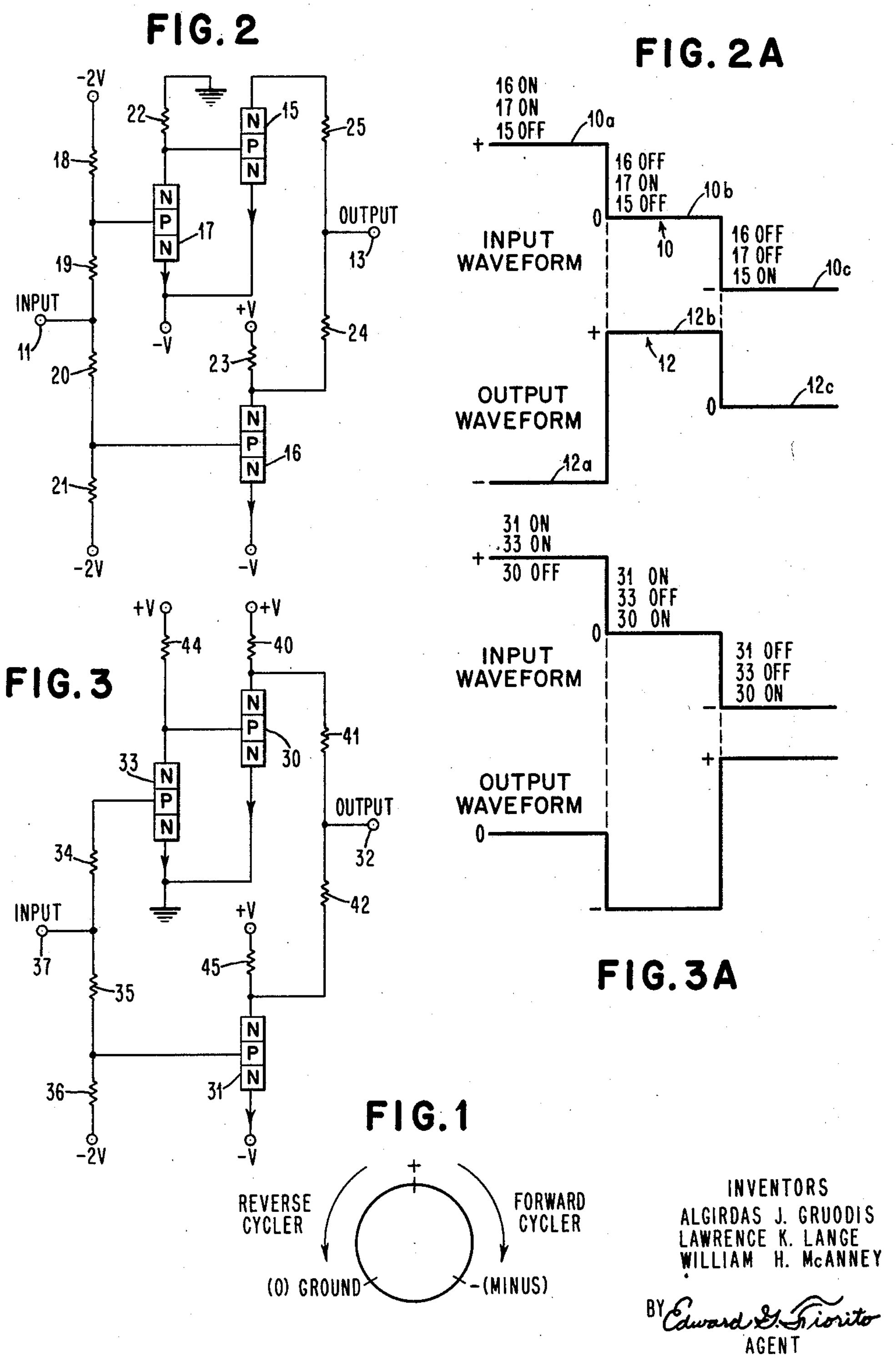
FIG. 1 is a functional diagram illustrating the logical operation of a cycler.
FIG. 2 is a circuit diagram of a forward cycler embodying the present invention.

FIG. 2*a* is a wave form diagram representing the operation of the circuit of FIG. 2.

FIG. 3 is a circuit diagram of a reverse cycler embodying the present invention.

FIG. 3*a* is a wave form diagram illustrating the operation of the circuit of FIG. 3.

Figure 4:
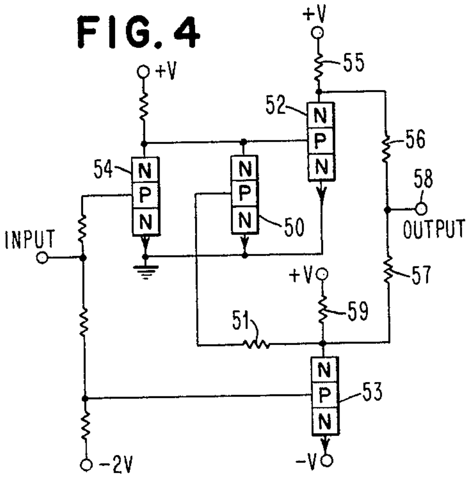

FIG. 4 is a circuit diagram of a reverse cycler which illustrates a modification of the circuit of FIG. 3.

Figure 4A:
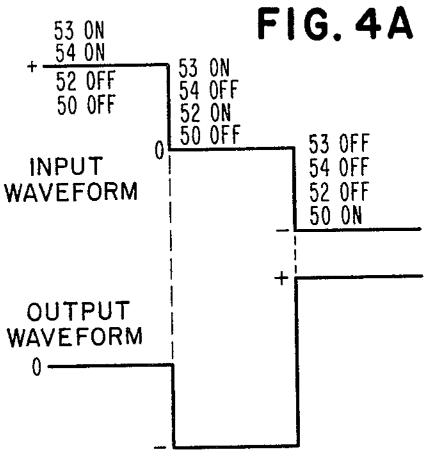

FIG. 4*a* is a wave form diagram illustrating the operation of the circuit of FIG. 4.

Figure 5:
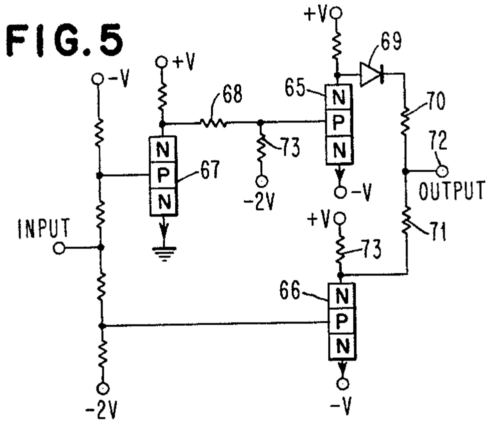

FIG. 5 is a circuit diagram of a reverse cycler which illustrates still another modification of the circuit of FIG. 3.

Figure 5A:
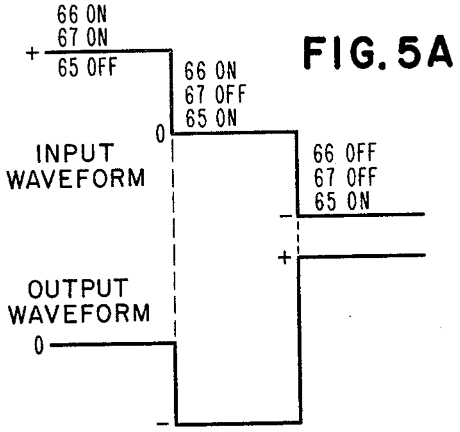

FIG. 5*a* is a wave form diagram of the operation of the circuit of FIG. 5.

Figure 6:
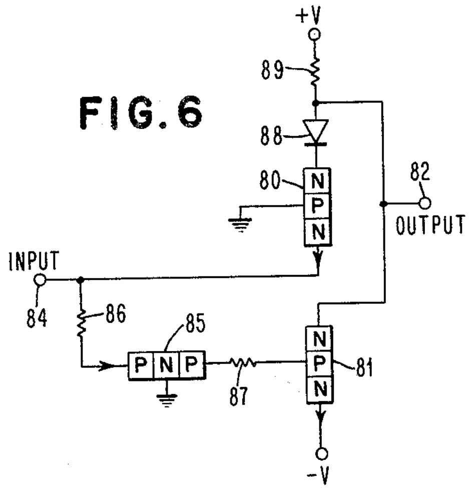

FIG. 6 is a circuit diagram of another forward cycler embodying the present invention.

Figure 6A:
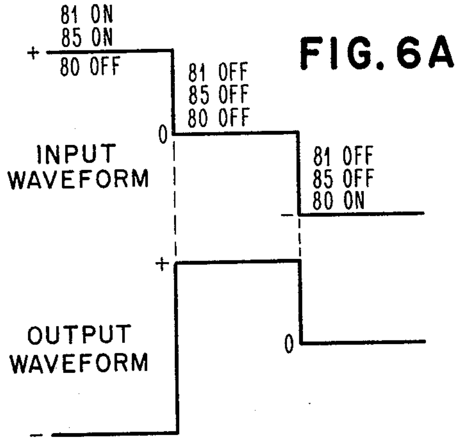

FIG. 6*a* is a wave form diagram of the operation of the circuit of FIG. 6.

The logical operation of the cycler is illustrated in FIG. 1. The three signal levels of a ternary signal are illustrated as a positive voltage, a negative voltage and a ground voltage. A positive level signal applied to a forward cycler, produces a negative level signal at the output. This conversion is represented in FIG. 1 by the clockwise arrow going from the positive sign to the negative sign. A negative signal applied to a forward cycler, produces a ground signal at the output. Finally, a ground sigal applied to a forward cycler, produces a positive signal at the output, completing the cycle. The operation of the reverse cycler is represented by the arrow in the counterclockwise direction. A positive signal input provides a ground signal output. A ground input results in a negative output and a negative input results in a positive output, completing the cycle.

Shown in FIG. 2 is a circuit which performs the forward cycler operation. The ternary input represented by wave form 10 is applied to the input terminal 11 and the the output represented by wave form 12 is generated at the output terminal 13. Shown in FIG. 3 is a circuit similar to that shown in FIG. 2. The circuit of FIG. 3 performs the reverse cycler operation. The circuits of FIGS. 4 and 5 perform the reverse cycler operation, and the circuit of FIG. 6 performs the forward cycler operation. All circuits are described in detail below.

*Forward Cycler, FIG. 2*

The transistors illustrated in FIGS. 2–6 are of the junction type. Each has a base (the intermediate electrode), an emitter (designated by the adjacent arrow), and a collector (the remaining electrode). Three different potential sources are illustrated in FIG. 2. The +V potential source has a value above ground, the −V potential source below ground, and the −2V potential source has a value more negative than the −V potential source. Transistors 15 and 16 perform as switches, switching the +V and −V potential sources to the output circuit including resistors 24 and 25. Transistor 17 and divider network, including resistors 18–21, control the transistor switches 15 and 16 in response to the ternary signal applied to the terminal 11. Resistors 18–21 are designed so that, when the signal on terminal 11 is positive, transistors 16 and 17 are conducting. When transistor 17 conducts, a voltage drop appears across resistor 22 and the collector approaches the negative potential of the −V source connected to the emitter of transistor 17. This negative collector signal is coupled to the base of transistor 15, cutting off conduction therein. When transistor 16 conducts, a potential drop appears across the resistor 23, causing the signal at the collector of transistor 16 to approach the potential of the −V source connected to the emitter of transistor 16. The negative collector signal is switched to the resistor 24. With transistor 16 conducting and transistor 15 cut off, the −V source connected to the emitter of transistor 16 is effectively coupled to the output terminal 13 by resistor 24. This condition is represented in FIG. 2*a* by the portions 10*a* and 12*a* of the wave forms.

The +V potential source connected to the resistor 23 is effectively switched to the output terminal 13 when transistors 15 and 16 are cut off. Transistors 15 and 16 can be cut off by applying a ground level signal to the input terminal 11. The divider network 18–21 is designed so that a ground signal on terminal 11 causes transistor 17 to conduct and transistor 16 to cut off. As described before, when transistor 17 conducts, transistor 15 is cut off. With transistors 15 and 16 both cut off, the +V source connected to resistor 23 is effectively switched to the output terminal 13. This condition is represented by the portions 10*b* and 12*b* of the wave forms.

The remaining input condition to be described is the negative signal level. The divider network is designed so that a negative input level causes transistors 16 and 17 to cut off. The −2V potential source is coupled by resistors 18 and 21 to the bases of transistors 16 and 17, thereby driving the base voltage below the emitter voltage for these transistors. When transistor 17 cuts off, a ground signal is coupled through resistor 22 to the base of transistor 15, thereby causing transistor 15 to conduct. When transistor 15 conducts, the signal at its collector approaches the potential of the −V source connected to its emitter. This signal is switched to resistor 25. Resistors 23–25 form a divider network. The terminal 13 is connected at a point along this divider where the voltage is at ground when transistor 16 is cut off and transistor 15 is conducting. This condition is represented by the portions 10*c* and 12*c* of the wave forms shown in FIG. 2*a*.

*Reverse Cycler, FIG. 3*

The circuit of FIG. 3 is essentially the same as the circuit of FIG. 2, the only substantial difference being in the value of the potential sources applied to each circuit. Transistors 30 and 31 perform as switches, switching the +V and −V, potential sources to the output circuit 41 and 42, in a manner similar to transistors 15 and 16. Transistor 33 and divider network, including resistor 34–36, form a control network controlling the conduction of transistors 30 and 31 in response to a ternary input signal applied to terminal 37. A positive signal on input terminal 37 is coupled by resistors 34 and 35 to transistors 31 and 33, thereby causing them to conduct. Conduction of transistor 33 cuts off transistor 30. Resistors 40, 41, and 42 form a divider network. The output 32 is connected along this divider at a point where the signal is at ground when transistor 30 is cut off and transistor 31 is conducting.

A ground input on terminal 37 causes transistor 31 to conduct and transistor 33 to cut off. This may be accomplished by making the value of resistor 35 small relative to the value of resistor 34. This operation can also be achieved, as shown in FIG. 3, by connecting the emitter of 33 to a ground source and the emitter of transistor 31 to a −V source. Therefore, a ground input on terminal 37 forward biases the base-emitter junction of transistor 31 but not the base-emitter junction of transistor 33. When transistor 33 cuts off, a positive signal from the +V potential source is coupled through resistor 44 to the base of transistor 30, thereby causing transistor 30 to conduct. When transistor 30 conducts, the signal at its collector is essentially at ground. Therefore, the signal at output terminal 32 is at some negative potential determined by the −V source connected to the emitter of transistor 31.

When a negative signal is applied to the input terminal 37, transistors 31 and 33 cut off. The circuit of FIG. 3 does not need a resistor and potential source, such as resistor 18 and the −2V source shown in FIG. 2, because the emitter of transistor 33 is connected to ground, thereby causing emitter-base junction to be reversed biased when the input signal is negative. With transistor 33 cut off, transistor 30 is conducting. Since transistor 31 is cut off, the +V source connected to resistor 45 is switched to the resistor 42. Since the signal at the collector of transistor 30 is essentially at ground, the signal at output terminal 32 is at a positive potential determined by the value of the +V source connected to resistor 45. The wave forms in FIG. 3*a* illustrate the three conditions of the circuit described. The functional operation of the circuit is represented by the counterclockwise arrow in FIG. 1. A positive input signal shifts counterclockwise to a ground output. A ground input shifts to a negative output, and, finally, a negative input shifts to a positive output, completing the cycle.

*Reverse Cycler, FIG. 4*

FIG. 4 illustrates a modification of the circuit of FIG. 3. Transistor 50 and resistor 51 have been added. They improve control of the transistor switches 52 and 53 so that, when transistor 53 is cut off, transistor 52 is also cut off, providing an output level higher than the positive level provided by the circuit of FIG. 3. When the input signal is negative, transistors 53 and 54 are cut off. A positive signal is fed back through resistor 51 to the base of transistor 50, causing it to conduct. Conduction of transistor 50 cuts off transistor 52. The +V source connected to resistor 55 is switched to the output circuit including resistors 56 and 57. The +V potential source connected to resistor 59 is also switched to the output circuit. Therefore, the signal on the output terminal 58 approaches the voltage level of the +V potential source. This output voltage on terminal 58 is higher than the positive output voltage obtainable from the circuit of FIG. 3. As shown in FIG. 3*a*, when the input signal is negative, transistor 30 conducts, switching a ground potential to the output circuit instead of a potential source of +V.

For positive inputs and ground inputs, the operation of the circuit of FIG. 4 is the same as the operation of the circuit of FIG. 3. Transistor 53 conducts for these conditions and feeds back, through resistor 51, a negative signal cutting off transistor 50. Therefore, transistor 54 is free to control the operation of transistor 52 in the same manner that transistor 33 in FIG. 3 controls the operation of transistor 30. In both circuits shown in FIGS. 3 and 4 the +V potential source is switched by at least one of the transistors to the output circuit in order to determine the positive output level.

*Reverse Cycler, FIG. 5*

Another modification of the circuit of FIG. 3 is illustrated in FIG. 5. A −V potential source is connected to the emitter of switching transistor 65 instead of a ground potential which was connected to the emitter of switching transistor 30 in FIG. 3. This results in a more negative output signal when transistors 65 and 66 are conducting. A ground input signal causes transistor 66 to conduct and transistor 67 to cut off. When transistor 67 cuts off, a positive signal is coupled by resistor 68 to the base of transistor 65, causing it to conduct. The —V potential source connected to the emitter of transistor 65 is switched to the output circuit including elements 69–71. Since transistor 66 is also conducting, the signal at terminal 72 approaches the negative potential of the —V source. This signal is more negative than the signal obtainable from the circuit of FIG. 3, since the emitter of transistor 30 in FIG. 3 is connected to a ground source.

Since the emitter of transistor 65 is connected to a —V source, the base must be coupled to a —2V source through the resistor 73 in order to cut off transistor 65 when the transistor 67 is conducting. The embodiment shown in FIG. 5 illustrates that a three-level signal can be switched to the output circuit by two switching transistors 65 and 66 connected to only two potential sources. +V and —V. In each of the circuits of FIGS. 3 and 5 the —V source is switched by at least one of the transistors to the output circuit.

The diode 69, FIG. 5, was inserted so that when transistor 66 is cut off and transistor 65 is conducting, the output signal on terminal 72 is free to approach the positive supply connected to the resistor 73 because the diode 69 is back biased, isolating the output circuit from the negative signal at the collector of transistor 65.

The circuit of FIG. 6 differs from the circuits described thus far. However, some similarities are the two switching transistors 80 and 81, which switch the +V and —V potential sources to an output circuit including the connections to the output terminal 82. Also, the switching transistors 80 and 81 are controlled by a circuit including resistors 86 and 87, transistor 85, and a connection between the input terminal 84 and the emitter of transistor 80. The difference is in the manner in which the ground signal output level is generated. No divider network, such as resistors 24 and 25 in FIG. 2, is employed. The ground potential source connected to the base of transistor 80 determines the ground signal level at the output terminal 82. Also, the particular circuit for performing the control operation is different from the circuits used for control in FIGS. 2–5.

When the input signal on terminal 84 is positive, transistor 80 is cut off since the emitter-base junction is reverse biased. The positive input signal causes transistor 85 to conduct, which causes transistor 81 to conduct. Conduction of transistor 81 switches the —V source connected to its emitter to the output terminal 82. The diode 88 is placed in series with the collector of transistor 80 in order to isolate the collector of transistor 80 from the negative signal at the output terminal. The diode 88 is back biased at this time, preventing the base-collector junction of transistor 80 from being forward biased. Without the diode 88, current would flow from the ground source into the base and out of the collector of transistor 80, causing improper operation of the circuit.

When the input signal is at the ground level, the transistor 85 is cut off since the base and emitter are essentially at the same ground potential. Any conduction into the emitter of transistor 85 would cause a potential drop across the resistor 86, causing the emitter voltage to be below ground. Therefore, the resistor 86 ensures that the transistor 85 is cut off when the input is at the ground potential. Since transistor 85 is not conducting, transistor 81 is cut off. The ground signal on input terminal 84 causes transistor 80 to be cut off, the base and emitter being at the same potential. Since both transistors 80 and 81 are cut off, the +V potential source connected to the resistor 89 is switched to the output terminal 82.

When the input signal on terminal 84 is negative, transistor 85 is cut off and transistor 81 is cut off. Transistor 80 conducts when the input signal is at the negative level. Conduction of transistor 80 causes a potential drop across the resistor 89, causing the signal on the output terminal 82 to drop. The signal at the collector of transistor 80 does not drop all the way down to the level of the signal at the emitter of transistor 80, as in the case of conduction of transistor 81, for example. This is because the base of transistor 80 is connected directly to a source of ground potential preventing the base voltage from varying from the ground potential. Therefore, since the collector voltage cannot go below the voltage of the base, the output is established at the ground signal level. The operation of transistor 81 is different from transistor 80. The signal on the collector of 81 approaches the negative level of the source connected to the emitter of transistor 81 because the signal on the base of transistor 81 is not clamped to the ground potential. Current flowing through the resistor 87 causes a potential drop across the resistor and, therefore, the signal at the base of transistor 81 drops down toward the negative signal level of the —V potential source connected to the transistor 81.

In summary, each of the cycler circuits in FIGS. 2–6 has the feature of employing two potential sources, +V and —V, which are switched to an output circuit by two transistors, for example in FIG. 2, transistors 15 and 16. The output circuit in FIGS. 2–5 includes a divider network which sets the ground output signal level when one of the two switching transistors is conducting and the other is cut off. However, the circuit of FIG. 6 shows another manner of setting the ground output signal level, that of connecting a ground potential source to the base of the transistor 80. Therefore, a divider network is not required in the output circuit of this cycler.

The cycler in FIG. 5 illustrates that only two potential sources are required to be connected to the switching transistors 65 and 66. The emitter of transistor 65 is connected to a —V potential source, while the emitter of transistor 30 in FIG. 3 is connected to the ground potential source.

Each of the cyclers in FIGS. 2–6 includes a control network which accepts the ternary input and provides control signals to the switching transistors. In FIGS. 2, 3 and 5, a single transistor and a divider network is used to perform the control function. The cycler of FIG. 4 illustrates that the control function can be improved by adding a second transistor 50 to the control circuit. The cycler of FIG. 6 illustrates that a divider network is not required in performing the control function.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A three-valued switching circuit for cycling an input signal capable of existing at a first, an intermediate, or a second level comprising:

a first and a second potential source, said first source corresponding to said first level and said second source corresponding to said second level;

a first and a second transistor, each having a base, emitter, and collector electrodes, said first and second transistor emitters being connected to said first source and said second transistor collector being connected to said second source;

output circuit means connected to said collector, said output circuit means forming a coupling connection between said collector and an output terminal and providing at said output terminal a signal corresponding to said intermediate level when said first transistor is conducting and said second transistor is not conducting; and a control circuit connected to said bases, said control circuit being controlled by said intermediate level input signal applied thereto for causing said transistors not to conduct, said control circuit further controlled by said second level input signal applied thereto for causing said second transistor to conduct, and said control circuit being additionally controlled by said first level input signal applied thereto for causing said first transistor to conduct and said second transistor not to conduct.

2. Apparatus as claimed in claim 1 wherein said output circuit includes a resistor divider network connected between said collectors, said divider having said output terminal connected at a point intermediate the ends of said divider where the signal corresponds to the intermediate level input signal when said first transistor is conducting and said second transistor is not conducting.

3. A three-valued switching circuit for cycling an input signal capable of existing at a first, an intermediate, or a second signal level comprising:

a first and a second and an intermediate potential source, said first source corresponding to said first level and said second source corresponding to said second level;

a first and a second transistor, each having a base, emitter, and collector electrodes, said collectors being connected to said second source, said first transistor emitter being connected to said intermediate source, and said second transistor emitter being connected to said first source;

output circuit means connected to said collectors for establishing a coupling connection between said collectors and an output terminal and for providing at said output terminal a signal corresponding to said intermediate level when said second transistor is conducting and said first transistor is not conducting;

a control circuit connected to said bases, said control circuit being controlled by an intermediate level input signal applied thereto for causing said transistors to conduct, said control circuit being further controlled by a second level input signal applied thereto for causing said second transistor to conduct and said first transistor not to conduct, and said control circuit being additionally controlled by a first level signal applied thereto for causing said second transistor not to conduct.

4. Apparatus as claimed in claim 3 wherein said output circuit includes a resistor divider network connected between said collectors, said divider having said output terminal connected at a point intermediate the ends of said divider where the signal corresponds to said intermediate level when said second transistor is conducting and said first transistor is not conducting.

5. A three-valued switching circuit for cycling an input signal capable of existing at a first, an intermediate, or a second level comprising:

a first and a second potential source, said first source corresponding to said first level and said second source corresponding to said second level;

a first and a second transistor, each having a base, emitter, and collector electrodes, said first and second transistor emitters being connected to said first source and said second transistor collector being connected to said second source;

output circuit means connected to said collectors, said output circuit means forming a coupling connection between said collectors and an output terminal and providing at said output terminal a signal corresponding to said intermediate level when said first transistor is conducting and said second transistor is not conducting;

a control circuit connected to said bases of said first and second transistors, said control circuit including a third transistor having a base, emitter and collector electrodes, the last-mentioned collector electrode being connected to said base of said first transistor, said emitter of said third transistor being connected to said first source, said control circuit being controlled by said intermediate level input signal for causing said first and second transistors not to conduct, said control circuit being further controlled by said second level input signal for causing said second transistor to conduct, and said control circuit being additionally controlled by said first level input signal for causing said first transistor to conduct and said second transistor not to conduct; and a divider network connected between said bases of said second and third transistors, said divider network having an input terminal connected at a point intermediate the ends of said divider network whereby an intermediate level signal applied to said input terminal causes said third transistor to conduct and said second transistor not to conduct.

6. A three-valued switching circuit for cycling an input signal capable of existing at a first, an intermediate, or a second signal level comprising:

a first and second and intermediate potential source, said first source corresponding to said first level and said second source corresponding to said second level;

a first and a second transistor, each having a base, emitter, and collector electrodes, said collectors being connected to said second source, said first transistor emitter being connected to said intermediate source, and said second transistor emitter being connected to said first source;

output circuit means connected to said collectors for establishing a coupling connection between said collectors and an output terminal and for providing at said output terminal a signal corresponding to said intermediate level when said second transistor is conducting and said first transistor is not conducting;

a control circuit connected to said bases, said control circuit including a third transistor having a base, emitter and collector electrodes, said emitter of said third transistor being connected to said intermediate source, said last-mentioned collector electrode being connected to said base of said first transistor, said control circuit being controlled by an intermediate level input signal for causing said first and second transistors to conduct, said control circuit being further controlled by a second level input signal for causing said second transistor to conduct and said first transistor not to conduct, said control circuit being additionally controlled by a first level signal for causing said second transistor not to conduct; and a divider network connected between said bases of said second and third transistors, said divider having an input terminal connected intermediate the ends of said divider at a point where an intermediate level signal applied to said input terminal causes said second transistor to conduct and said third transistor not to conduct.

7. A ternary switching circuit for cycling an input signal capable of existing at a first, an intermediate, or a second signal level comprising:

a first and a second potential source, said first source corresponding to said first level and said second source corresponding to said second level;

an output circuit;

two switching means, one of said switching means being connected between said first source and said output circuit and the other of said switching means being connected between said first source and a point common to both said second source and said output circuit;

said output circuit including means connected to said switching means for providing an output signal corresponding to said first, intermediate, and second levels in response to selective coupling of said potential sources to said output circuit;

a control circuit connected to said switching means, said control circuit being controlled by said intermediate level signal applied thereto for providing a first one of said control signals to said switching means thereby establishing a coupling connection between said second source and said output circuit, said control circuit being further controlled by said second level signal applied thereto for providing a second one of said control signals to said switching means thereby establishing a coupling connection between said first source and said output circuit, said control circuit being additionally controlled by said first level signal applied thereto for providing a third one of said control signals to said switching means thereby selectively establishing a coupling connection between said sources and said output circuit for providing an output signal corresponding to said intermediate level.

8. Apparatus as claimed in claim 7 wherein said output circuit includes a resistor divider network connected between said switching means, said divider having an output terminal connected into the network for providing a signal level corresponding to the intermediate level.

References Cited in the file of this patent

UNITED STATES PATENTS

| | | |
|---|---|---|
| 3,027,464 | Kosonocky | Mar. 27, 1962 |
| 3,060,330 | Trampel | Oct. 23, 1962 |

OTHER REFERENCES

"A Two Transistor Ternary Inverter," by K. M. Trampel in IBM Technical Disclosure Bulletin, vol. 4, No. 2, dated July 1961, pages 48–49.

"Ternary Logic Switch," published in IBM Technical Disclosure Bulletin, vol. 4, No. 5, dated October 1961, pages 58 and 59.